(12) United States Patent
Vytla et al.

(10) Patent No.: US 9,560,115 B2
(45) Date of Patent: Jan. 31, 2017

(54) REUSABLE SECURE FILE TRANSFER FOR MULTIPLE SYSTEMS

(71) Applicant: Siemens Product Lifecycle Management Software Inc., Plano, TX (US)

(72) Inventors: Venugopala Krishna Vytla, Mason, OH (US); Louis Boydstun, Wyoming, OH (US); Richard D. Eshom, Springdale, OH (US); Satish Chandra Katte, Troy, MI (US)

(73) Assignee: SIEMENS PRODUCT LIFECYCLE MANAGEMENT SOFTWARE INC., Plano, TX (US)

( * ) Notice: Subject to any disclaimer, the term of this patent is extended or adjusted under 35 U.S.C. 154(b) by 268 days.

(21) Appl. No.: 14/489,164

(22) Filed: Sep. 17, 2014

(65) Prior Publication Data

US 2015/0358389 A1 Dec. 10, 2015

Related U.S. Application Data

(60) Provisional application No. 62/007,488, filed on Jun. 4, 2014.

(51) Int. Cl.
| | | |
|---|---|---|
| *G06F 15/16* | (2006.01) | |
| *G06F 15/177* | (2006.01) | |
| *G06F 7/04* | (2006.01) | |
| *H04L 29/06* | (2006.01) | |
| *G06F 17/00* | (2006.01) | |
| *G06F 17/30* | (2006.01) | |
| *H04N 7/16* | (2011.01) | |
| *H04L 29/08* | (2006.01) | |

(52) U.S. Cl.
CPC ............... *H04L 67/06* (2013.01); *H04L 67/42* (2013.01); *H04L 69/14* (2013.01)

(58) Field of Classification Search
CPC ............... H04L 63/102; H04L 63/0428; H04L 63/0823; H04L 63/062; H04L 63/0807; H04L 29/06; H04L 67/06; H04L 67/022; H04L 67/42; H04L 67/2842
USPC .... 709/203, 217, 220, 222, 230; 726/4, 6, 9, 726/10, 15, 29
See application file for complete search history.

(56) References Cited

U.S. PATENT DOCUMENTS

| | | | | |
|---|---|---|---|---|
| 6,978,378 | B1* | 12/2005 | Koretz | G06F 3/0481 |
| | | | | 713/193 |
| 7,170,999 | B1* | 1/2007 | Kessler | G06F 21/606 |
| | | | | 380/201 |
| 7,707,424 | B2* | 4/2010 | Axelsson | G06F 21/606 |
| | | | | 713/179 |
| 8,150,914 | B1 | 4/2012 | Taneja et al. | |
| 2003/0046586 | A1* | 3/2003 | Bheemarasetti | H04L 63/0272 |
| | | | | 726/15 |
| 2005/0138350 | A1* | 6/2005 | Hariharan | H04L 63/0428 |
| | | | | 713/151 |

OTHER PUBLICATIONS

EP Search Report, dated Oct. 22, 2015, for EP Application 15170783.3, 5 pages.

* cited by examiner

*Primary Examiner* — Farzana Huq

(57) ABSTRACT

Methods for file transfer and corresponding systems and computer-readable mediums. A method includes sending a file download request, receiving a command instruction file, and downloading a file corresponding to the file download request according to the command instruction file.

17 Claims, 7 Drawing Sheets

REUSABLE SECURE FILE TRANSFER FOR MULTIPLE SYSTEMS

CROSS-REFERENCE TO OTHER APPLICATION

This application claims the benefit of the filing date of U.S. Provisional Patent Application 62/007,488, filed Jun. 4, 2014, which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems), and other systems that may transfer large volumes of data.

BACKGROUND OF THE DISCLOSURE

PDM systems manage PLM and other data. These systems and others may need to send or receive large volumes of data. Improved systems are desirable.

SUMMARY OF THE DISCLOSURE

Various disclosed embodiments include a data transfer manager that can function as a standalone application to handle uploading and downloading large files. A system as disclosed herein can be launched by various users and systems to handle file uploads and downloads. The disclosed data transfer manager performs secure file transfers asynchronously from the client and is an independent, reusable system that can be used with various systems, such as the Teamcenter software product of Siemens Product Lifecycle Management Software Inc. (Plano, Tex.), among others.

Various embodiments include methods for file transfer and corresponding systems and computer-readable mediums. A method includes sending a file download request, receiving a command instruction file, and downloading the file corresponding to the file download request according to the command instruction file.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Transferring data between a client and a server in a system presents a number of design considerations to achieve optimum performance. Some product data management systems were originally designed for small to medium-sized file transfers. It is desirable for product data management systems to be able to transfer large files (e.g. 500 GB and larger). However, in addition to the challenges involved in data transfers generally, there are a number of particular challenges inherent in transferring large files. These challenges include verifying the integrity of transferred data, accelerating file transfer rates, and cancelling or restarting transfers that are already in progress. The disclosed data transfer manager presents numerous features to address the challenges in transferring large files.

Disclosed embodiments include systems, methods, and standalone applications that can handle uploading and downloading large files. A system or software product as disclosed herein can be launched by various users and systems to handle large file uploads and downloads. A system in accordance with an embodiment of the present disclosure is an independent, reusable system that performs file transfers asynchronously from the client and can be used with various systems, such as the Teamcenter software product of Siemens Product Lifecycle Management Software Inc. (Plano, Tex.), among others.

Figure 1:
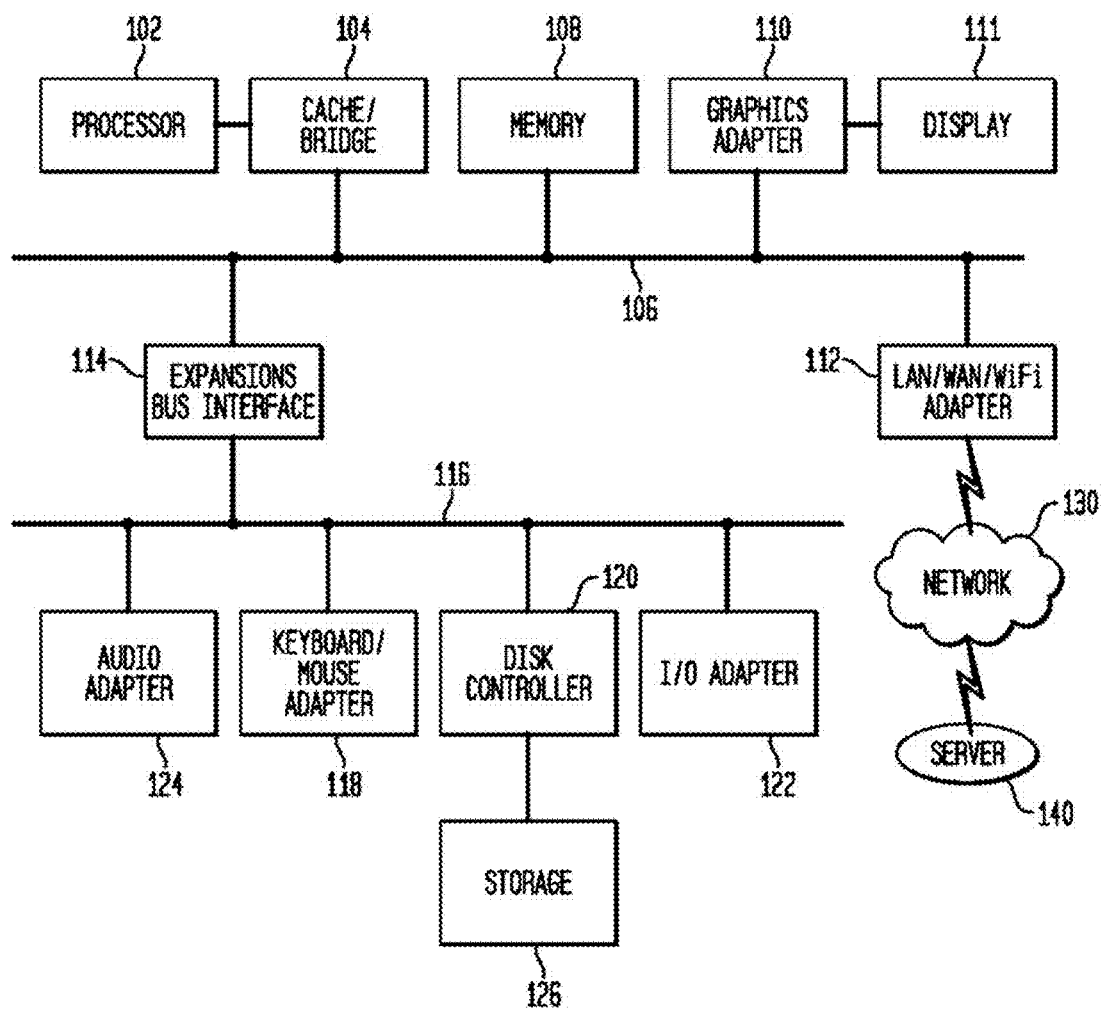
FIG. 1 illustrates a block diagram of a data processing system in which an embodiment can be implemented.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

While specific examples herein refer to the Teamcenter software product by Siemens Product Lifecycle Management Software, Inc. (Plano, Tex.), those of skill in the art will recognize that the techniques, processes, and features described herein can be used with any number of systems and software products.

The disclosed data transfer manager utilizes a concept of a command instruction file. The command instruction file contains a list of the transactions that, when executed, can perform a file transfer corresponding to a particular file transfer request. In one embodiment, a command instruction file could be, for example, a product lifecycle management definition ("PLMD") file. Those skilled in the art will recognize that this is just an example of one particular embodiment and that a command instruction file can be in various file formats. In a particular embodiment, the command instruction files can be invoked using MIME type extensions. The command instruction file serves multiple purposes in the file-transfer process, facilitating secure and asynchronous file transfer. In disclosed embodiments, the data transfer manager transfers files asynchronously according to the command instruction files.

One non-limiting example of the contents of a command instruction file is as below.

```
<?xml version="1.0" encoding="UTF-8"?>
<!-- main structure plmdInfo -->
<!ELEMENT plmdInfo (downloadInfo*, uploadInfo*, bootstrapInfo)>
<!ELEMENT downloadInfo (property+)>
<!ELEMENT uploadInfo (property+)>
<!ELEMENT bootstrapInfo (property+)>
<!ELEMENT property EMPTY>
<!ATTLIST property
    name CDATA #REQUIRED
    value CDATA #REQUIRED
>
```

According to various embodiments, a file upload can use the following properties: ticket (sent to the file server as authorization token, which identifies the upload ticket) and fscUrl (at least one, which identifies the address of the file server). The file server may be referred to herein as the "FSC." Other optional upload properties include the filePath or fileExtension (used for browser user interface decisions), datasetName (identifies the name of the dataset, sent to FSC as metadata), datasetTypeName (identifies the type of the dataset, sent to FSC as metadata), and referenceName (a reference name for the upload, sent to FSC as metadata).

According to various embodiments, a file download can use the following properties: filePath or originalFileName (if originalFileName is provided, a file with this name will be included in the default Download Manager staging directory), ticket (sent to FSC as authorization token), and fscUrl (at least one, which identifies the address of the file server). The commend instruction file includes at least an address of the file server from which the file is downloaded.

The following is a non-limiting example of a command instruction file that can be generated and used when a single file upload is requested via a thin client. The tickets in the command instruction file can be encrypted when processed by the client system, and the original unencrypted file can be deleted. For example, the client system can perform a local encryption of the ticket at the client based on the client system's MAC address. In other embodiments, public/private key pairs between the client system and the server system are used for encryption. An (unencrypted) sample is shown below in XML format for illustration:

```
<plmdInfo>
    <uploadInfo>
        <property name="datasetName" value="DM_Test_Log" />
        <property name="datasetTypeName" value="Text" />
        <property name="referenceName" value="Text" />
        <property name="fileExtension" value="*" />
        <property name="ticket"
value="4340e85bee8f98ee3ca655111185407e46cdbe1516d759f38f9de9f8d8
3db5a2v1002F000000000000027051dad7a786582a5b2013%2f07%2f09+03%3a1
5%3a56-
2041042341++++++++++++++++++++infodba++++++++++++++++++++++++00
e45193573a86582a5b+++++++++++++%5cdba_51938f7f%5cdm_test_tex_jep08
jw4z9c6k.dat" />
    <uploadInfo/>
     <bootstrapInfo>
        <property name="fscUrl" value="http://TRI6W236:4563" />
    <bootstrapInfo/>
<plmdInfo/>
```

The following is a non-limiting example of a command instruction file that can be generated and used when a single file download is requested via a thin client:

```
<plmdInfo>
    <downloadInfo>
        <property name="fscUrls" value="http://TRI6W236:4563" />
        <property name="datasetName" value="example" />
        <property name="datasetTypeName" value="MSWordX" />
        <property name="originalFileName" value="example.docx" />
        <property name="referenceName" value="word" />
        <property name="fileExtension" value=".docx" />
        <property name="ticket"
value="14d4e7aefe0e40d92eac5ee08fdd095c255f243f837320d9b4ec8c0dd2
0d81f5v1004T00000000000006a751bee18286582a5b2013%2f07%2f10+01%3a0
7%3a54-
2041042341++++++++++++++++++++infodba++++++++++++++++++++++++00
e45193573a86582a5b+++++++++++++%5cdba_51938f7f%5cexampl_wor_094067
44y62ky.docx" />
```

The following is a non-limiting example of a command instruction file that can be generated and used when a multiple-file upload is requested:

```
<plmdInfo>
    <uploadInfo>
        <property name="datasetName" value="DM_Test_Log" />
        <property name="datasetTypeName" value="Text" />
        <property name="filePath"
value="C:\Temp\itkaos.exe1dfc0ff1.syslog" />
        <property name="originalFileName"
value="itkaos.exe1dfc0ff1.syslog" />
        <property name="referenceName" value="Text" />
        <property name="fileExtension" value="*" />
        <property name="ticket"
value="4340e85bee8f98ee3ca655111185407e46cdbe1516d759f38f9de9f8d8
3db5a2v1002F000000000000027051dad7a786582a5b2013%2f07%2f09+03%3a1
5%3a56-
2041042341++++++++++++++++++++infodba++++++++++++++++++++++++00
e45193573a86582a5b+++++++++++++%5cdba_51938f7f%5cdm_test_tex_jep08
jw4z9c6k.dat" />
    <uploadInfo/>
    <uploadInfo>
        <property name="datasetName" value="DM_Java_Src" />
        <property name="datasetTypeName" value="Text" />
        <property name="filePath"
value="C:\user\workspace\DMExpt\src\test1.java" />
        <property name="originalFileName" value="test1.java" />
        <property name="referenceName" value="Text" />
```

```
        <property name="fileExtension" value="*" />
        <property name="ticket"
value="c32383a8476dc0713b865788e7368886e6c33d244361c2e61f0f9f5bdb
f6e9d9v1002F000000000000027f51dad7a786582a5b2013%2f07%2f09+03%3a1
5%3a57-
2041042341++++++++++++++++++++infodba++++++++++++++++++++++++00
e45193573a86582a5b+++++++++++++%5cdba__51938f7f%5cdm__java__tex__0ij08
jw4z9c61.dat" />
    <uploadInfo/>
    <bootstrapInfo>
        <property name="fscUrl" value="http://ABC123:4563" />
    <bootstrapInfo/>
<plmdInfo/>
```

The following is another non-limiting example of a command instruction file that can be generated and used when a multiple-file upload is requested:

```
<plmdInfo>
    <uploadInfo>
        <property name="ticket"
value="af7ce85bee8f98ee3ca655111185407e46cdbe1516d759f38f9de9f8d8
3db5a2v1002F000000000000027051dad7a786582a5b2013%2f07%2f09+03%3a1
5%3a56-
2041042341++++++++++++++++++++infodba++++++++++++++++++++++++00
e45193573a86582a5b+++++++++++++%5cdba__51938f7f%5cdm__test__tex__jep08
jw4z9c6k.dat" />
    <uploadInfo/>
    <uploadInfo>
        <property name="fscUrls" value="http://ABC123:4563" />
        <property name="ticket"
value="6c2383a8476dc0713b865788e7368886e6c33d244361c2e61f0f9f5bdb
f6e9d9v1002F000000000000027f51dad7a786582a5b2013%2f07%2f09+03%3a1
5%3a57-
2041042341++++++++++++++++++++infodba++++++++++++++++++++++++00
e45193573a86582a5b+++++++++++++%5cdba__51938f7f%5cdm__java__tex__0ij08
jw4z9c61.dat" />
    <uploadInfo/>
    <bootstrapInfo>
        <property name="fscUrl" value="http://ABC123:4563" />
    <bootstrapInfo/>
<plmdInfo/>
```

The following is another non-limiting example of a command instruction file that can be generated and used when a multiple-file upload is requested:

```
<plmdInfo>
    <uploadInfo>
        <property name="datasetName" value="ITKAOS__DS__008" />
        <property name="datasetTypeName" value="Image" />
        <property name="filePath" value="" />
        <property name="originalFileName"
value="dm__default__original__filename.bin" />
        <property name="referenceName" value="Image" />
        <property name="fileExtension" value=".bin" />
        <property name="ticket"
value="25ecd191cb265bb42f4399cfcda9aaf388e1697ad41de0c98400fe193a
7d09eev100WT00000000000002d652e7cc8b87abaaff2014%2f01%2f28+20%3a3
1%3a41-
2018792705++++++++++++++++++++infodba++++++++++++++++++++++++00
e452e6cb6587abaaff+++++++++++++%5cdba__52e711bd%5citkaos__ds___ima__2c
0038459r7n6.bin" />
    </uploadInfo>
    <uploadInfo>
        <property name="datasetName" value="ITKAOS__DS__008" />
        <property name="datasetTypeName" value="Image" />
        <property name="filePath" value="" />
        <property name="originalFileName"
value="dm__default__original__filename.bin" />
        <property name="referenceName" value="Image" />
        <property name="fileExtension" value=".bin" />
```

-continued

```
    <property name="ticket"
value="ca42ed888116b27e6d699509df9ae5b029a6eb2fdeec0a06c7ae026914
c17af5v100WT00000000000002d852e7cc8b87abaaff2014%2f01%2f28+20%3a3
1%3a41-
2018792705++++++++++++++++++++++infodba++++++++++++++++++++++++00
e452e6cb6587abaaff+++++++++++++%5cdba__52e711bd%5citkaos__ds___ima__41
7038459r7n7.bin" />
    </uploadInfo>
    <uploadInfo>
        <property name="datasetName" value="ITKAOS_DS_008" />
        <property name="datasetTypeName" value="Image" />
        <property name="filePath" value="" />
        <property name="originalFileName"
value="dm_default_original_filename.bin" />
        <property name="referenceName" value="Image" />
        <property name="fileExtension" value=".bin" />
        <property name="ticket"
value="77a6fc097c6406a6562eb2745ea0fb96c96f199fd5b5550eb50a6b19d9
e710e8v100WT00000000000002da52e7cc8b87abaaff2014%2f01%2f28+20%3a3
1%3a41-
2018792705++++++++++++++++++++++infodba++++++++++++++++++++++++00
e452e6cb6587abaaff+++++++++++++%5cdba__52e711bd%5citkaos__ds___ima__2k
k038459r7n8.bin" />
    </uploadInfo>
    <uploadInfo>
        <property name="datasetName" value="ITKAOS_DS_008" />
        <property name="datasetTypeName" value="Image" />
        <property name="filePath" value="" />
        <property name="originalFileName"
value="dm_default_original_filename.bin" />
        <property name="referenceName" value="Image" />
        <property name="fileExtension" value=".bin" />
        <property name="ticket"
value="be9a53386fd4971e90e562bfe6d8091d058663c551878a20e4f7d63ff5
96b1c8v100WT00000000000002dc52e7cc8b87abaaff2014%2f01%2f28+20%3a3
1%3a41-
2018792705++++++++++++++++++++++infodba++++++++++++++++++++++++00
e452e6cb6587abaaff+++++++++++++%5cdba__52e711bd%5citkaos__ds___ima__es
o038459r7n9.bin" />
    </uploadInfo>
     <bootstrapInfo>
        <property name="fscUrl" value="http://127.0.0.1:5644" />
        <property name="keyName" value="TestSHA256withRSA" />
        <property name="signatureType" value="SHA256withRSA" />
        <property name="signature"
value="9e3657ab1606866ec2e032eeac9287132527c986cd60db6846f73527f7
784593512389aff8813bf076c025928d56193d683ba7f7975c5210382211a9756
401804186b61bd1085142d8caac5b42f96ec8af7d6319fb3a9da128996b341845
97b43c47e81e1089267f59a5616dd7a91ce92eba99ba362dfb1071f86bea70ec1
8ea09b5300be704795923d2eec06bb3d8493264114207ae6a48eb62d03f44a073
2ee9738a2af648d74e2ed147281009f389934ca0fd1a97435f95b33cc124b50ae
6e198756f4c5d26156a1a5dcbd9092c3c919d69bd428255b9ccb374b6f2b6f957
009a8c0236d949fb62f9f6ffc64dde2e00de6301bcea0323dc7da53a159afc1b"
/>
    </bootstrapInfo>
</plmdInfo>
```

Note, in the above example, the elements "keyName," "signatureType," and "signature," which can be used for public/private key pair encryption as the name, type, and content of the public or private key.

The following is a non-limiting example of a command instruction file that can be generated and used when a multiple-file download is requested:

```
<plmdInfo>
    <downloadInfo>
        <property name="originalFileName" value="example.docx" />
        <property name="ticket"
value="14d4e7aefe0e40d92eac5ee08fdd095c255f243f837320d9b4ec8c0dd2
0d81f5v1004T00000000000006a751bee18286582a5b2013%2f07%2f10+01%3a0
7%3a54-
2041042341++++++++++++++++++++++infodba++++++++++++++++++++++++00
e45193573a86582a5b+++++++++++++%5cdba__51938f7f%5cexampl__wor__094067
44y62ky.docx" />
```

```
        <downloadInfo/>
        <downloadInfo>
            <property name="originalFileName" value="mypart.prt" />
            <property name="ticket"
value="14d4e7aefe0e40d92eac5ee08fdd095c255f243f837320d9b4ec8c0dd2
0d81f5v1004T00000000000006a751bee18286582a5b2013%2f07%2f10+01%3a0
7%3a54-
2041042341++++++++++++++++++++++infodba+++++++++++++++++++++++++++0
e45193573a86582a5b++++++++++++++%5cdba_51938f7f%5cmypart_09406744y6
2ky.prt" />
        <downloadInfo/>
        <bootstrapInfo>
            <property name="fscUrl" value="http://ABC123:4563" />
        <bootstrapInfo/>
<plmdInfo/>
```

Figure 2:
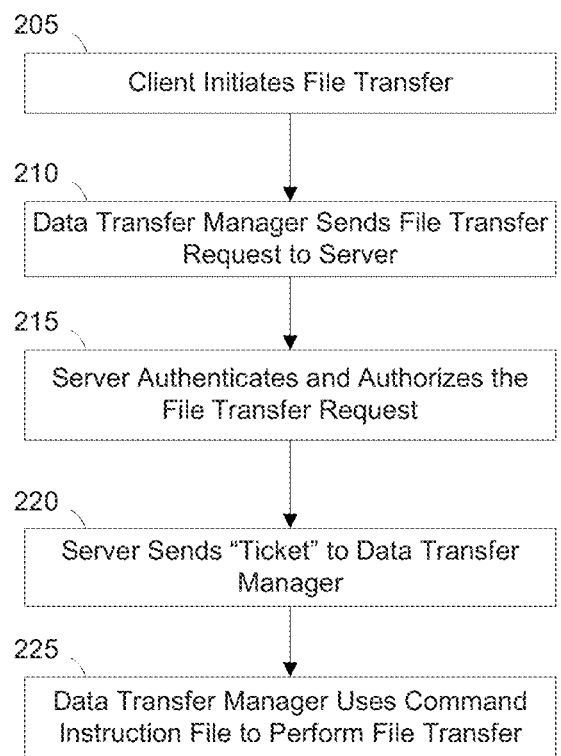
FIG. 2 illustrates a flowchart of a ticketing procedure in accordance with disclosed embodiments.

Disclosed embodiments can perform file transfers in a secure manner. To accomplish this, disclosed embodiments can implement a "ticket" procedure. FIG. 2 illustrates a flowchart of a ticketing procedure in accordance with disclosed embodiments. This procedure can be performed, for example, by a data transfer manager implemented on a client data processing system and a file server data processing system in a product data management system.

In step 205, the ticketing procedure begins by the client system receiving a user initiation of a file transfer by invoking the data transfer manager (step 205).

In step 210, the data transfer manager on the client system then sends a file transfer request to a server system in the product data management system. The file transfer request can be, for example, a file download request or a file upload request.

In step 215, the server authenticates and authorizes file transfer request (step 215).

In step 220, after authenticating and authorizing the file transfer request, the server can send a "ticket" to the data transfer manager. The ticket sent by the server can be, in some embodiments, either a "read ticket" or a "write ticket". In such an embodiment, a "read ticket" authorizes data to be read from a specific data object contained on the server. Similarly, in such an embodiment, a "write ticket" authorizes data to be written to a specific data object contained on the server. The ticket sent by the server includes, at least, the command instruction file that corresponds to the file transfer request. In disclosed embodiments, the command instruction file can be signed by the server using a private key. In such embodiments, this command instruction file is then decrypted by the data transfer manager using a corresponding public key. In this way, the disclosed system eliminates any possibility of accidentally transferring files to an unintended server. Further, in some embodiments, the tickets sent from the server can be configured to "expire" after a predetermined period of time.

In step 225, the data transfer manager uses the command instruction file to perform the file transfer corresponding to the file transfer request. The command instruction file contains a list of transactions that, when executed, perform a file transfer corresponding to the file transfer request. In disclosed embodiments, the data transfer manager can have one or more engines that are configured to execute the transactions contained in the command instruction file.

In a particular embodiment, the user of a client can be required to login to a server system in the PDM system to get access to a ticket. In such an embodiment, the client may then launch the data transfer manager, which may already be running, which with the ticket and the data transfer manager can asynchronously download the file.

Figure 3:
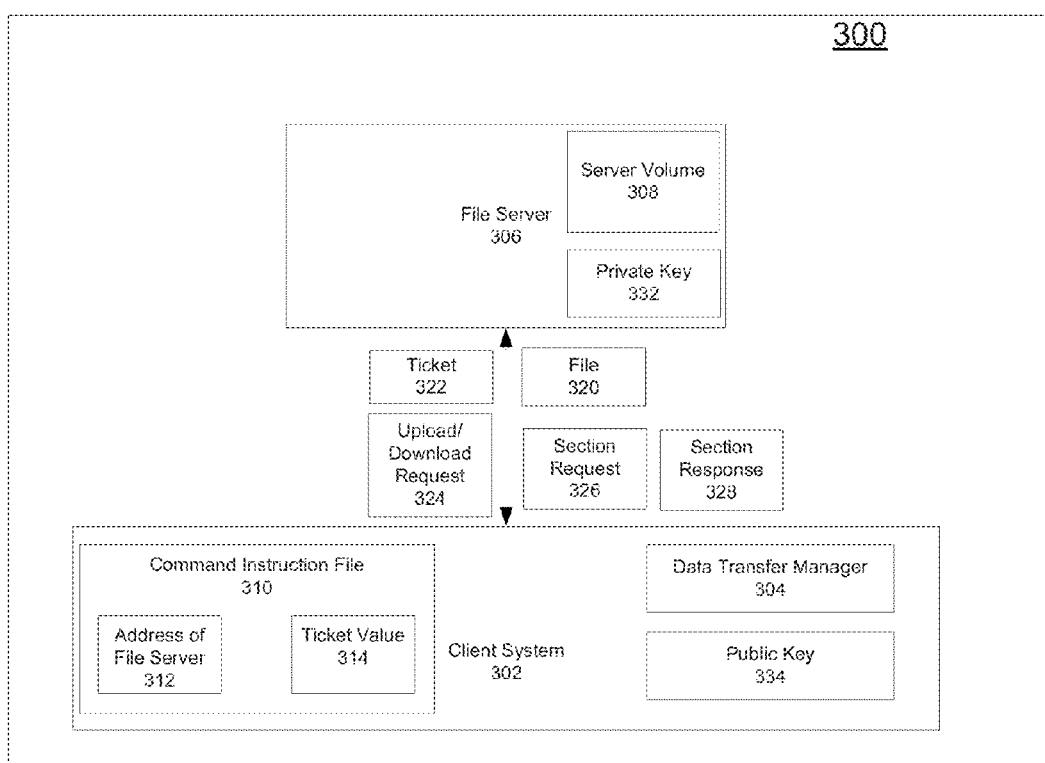
FIG. 3 illustrates a block diagram of a PDM system in which various embodiments of the present disclosure can be implemented.

FIG. 3 illustrates a block diagram of a product data management system 300 in which various embodiments of the present disclosure may be implemented. The product data management system 300 includes client system 302, data transfer manager 304 implemented on client system 302, file server data processing system 306 (referred to for brevity as file server 306), and server volume 308. Those skilled in the art will recognize that FIG. 3 serves only as an exemplary embodiment and a system in accordance with this disclosure could include various changes without departing from the spirit and scope of the disclosure in its broadest form. Alternative product data management systems could contain, for example, a plurality of server systems or client systems in accordance with the disclosed system.

Client system 302 represents a client data processing system in a product data management system 300. Client system 302 could be, in a disclosed embodiment, a data processing system as shown in FIG. 1. Users of client system 302 can initiate file transfers between file server 306 and client system 302 by invoking data transfer manager 304. The file transfers may be initiated in various manners. For example, in disclosed embodiments, a user of client system 302 can interact with a user interface that allows the user to initiate a file transfer. The user interface may also display various functionality features, such as "pause", "resume", and "cancel" features. The user interface can indicate transfer status and progress, along with any errors and interruptions. In a particular embodiment, a user can monitor multiple file transfers in the user interface and pause, resume, or cancel the transfers at any time.

Client system 302 can receive, generate, and store command instruction file 310 as described herein. Command instruction file 310 can include at least an address of the file server 312 and a ticket value 314. The command instruction file 310 can be encrypted using a public key 334 that corresponds to a private key 332 used by file server 306. The ticket value 314 can identify the read or write ticket 322.

Further, in some embodiments, the user can log off from an application implementing the disclosed system, such as the Teamcenter product by Siemens Product Lifecycle Management Software Inc. (Plano, Tex.), and data transfer manager 304 will continue the file transfer.

Similarly, in disclosed embodiments, the user can log off from or completely reboot client system 302 and data transfer manager 304 will display the paused transfers when the user logs back on to client system 302. In a particular embodiment, transfers can be restarted even when the user is not logged on to client system 302, taking into consideration ticket expiration while restarting transfers. This embodiment allows a transfer to be restarted after an interruption without waiting for the user to log on to the system. In such a system, data transfer manager 304 can restart the transfer without receiving a new ticket from file server 306, as long as the current ticket has not expired. If the current ticket has expired, the user can easily get a new ticket using the procedure disclosed above and resume the file transfer from the point of interruption.

Data transfer manager 304 is implemented on client system 302 and facilitates file transfers in accordance with the disclosed method. In this figure, file 320 represents the one or more files being uploaded or downloaded as described herein, including file sections, and ticket 322 represents the read ticket or write ticket communicated between systems as described herein. Upload/download request 324 represents the request for an upload or download that is communicated between the systems as described herein. Section request 326 represents the section request described herein, and section response 328 represents the section response described herein.

In disclosed embodiments, data transfer manager 304 can check that sufficient disk space is available for the file transfer on server volume 308 and client system 302's storage system, such as storage 126 in data processing system 100 of FIG. 1. In some embodiments, data transfer manager 304 can check the available disk space before the transfer starts. For the transfer of large files, a file transfer may take a substantial amount of time to complete. In that time, the available disk space may have changed considerably. In a particular embodiment, data transfer manager 304 can check the available disk space periodically to ensure there is enough disk space to complete the file transfer.

Transfer-rate is an important consideration in transferring large files. To facilitate accelerated transfer, large files are divided into sections prior to transfer. Sections may then be transmitted between client system 302 and file server 306 over multiple threads, such as HTTP connections. Transferring data over multiple threads assists in avoiding data-transfer throttling effects, such as TCP window throttling. In disclosed embodiments, a thread transferring data slowly can be closed and replaced with a new thread. Further, in particular embodiments, data can be compressed prior to transfer to further accelerate the file transfer rate.

Disclosed embodiments can validate the integrity of transferred data during the transfer. The data integrity validation can comprise, for example, using a hash algorithm, such as an MD5 hash algorithm, to generate digests. Disclosed embodiments can generate digests for both the entire file being transferred and for each of the file sections. In a particular embodiment, the integrity of transferred data may be validated periodically during the transfer. In such an embodiment, any file section that fails the integrity validation will be retransferred. If a file section cannot be retransmitted after a predetermined number of attempts, then data transfer manager 304 can notify client system 302 of the validation error. For upload transfers, in response to successfully transferring all file sections, an entire-file digest can be retained on server volume 308 so that file integrity can be checked from time to time, to ensure that the file is not corrupted after upload.

File server 306 is a data processing system that can be implemented, for example, as a data processing system as shown in FIG. 1. Connected to file server 306 is server volume 308. Server volume 308 serves as a storage system for file server 306. During file transfers, file server 306 can read from and write to data objects on server volume 308.

File server 306 is communicatively coupled to client system 302 and data transfer manager 304 running on client system 302. In disclosed embodiments, client system 302 can communicate with file server 306, for example, over a network, such as network 130 in data processing system 100 of FIG. 1. File server 306 can store a private key 332 used for encryption/decryption, and client system 302 can store a corresponding public key 334 used for encryption/decryption. In some embodiments, the public key 334 can be part of command instruction file 310. In some embodiments, command instruction file 310 is encrypted using the private key 332 and decrypted using the public key 334, or vice versa.

Figure 4:
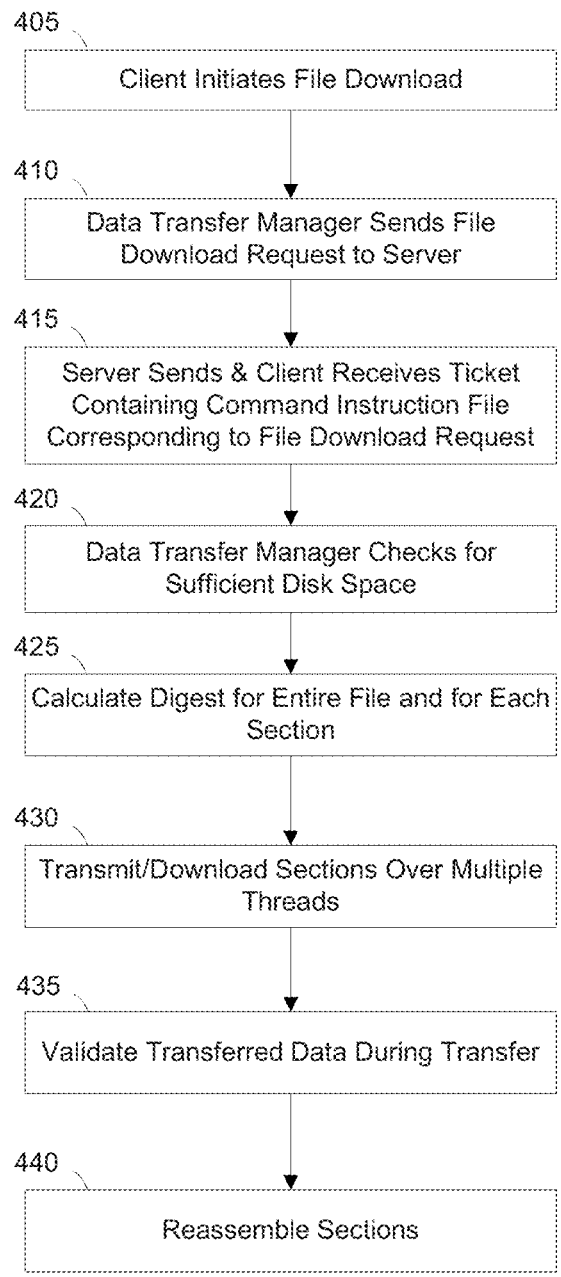
FIG. 4 illustrates a flowchart of a file download process in accordance with disclosed embodiments.

FIG. 4 illustrates a flowchart of a file download process in accordance with disclosed embodiments that may be performed, for example, by one or more file server systems and one or more client systems in a product data management system. FIG. 4 is described in reference to the block diagram in FIG. 3. Initially, in step 405, client system 302 can receive a user command to initiate a file download from file server 306 to client system 302 by invoking data transfer manager 304.

In step 410, client system 302 can use data transfer manager 304 to send a file download request 324 to file server 306.

In step 415, data transfer manager 304 on client system 302 receives a read ticket from file server 306. In disclosed embodiments, the read ticket received by data transfer manager 304 contains, at least, a command instruction file 310 corresponding to the file download request. The command instruction file 310 can include at least an address of a file server 312 from which the file is downloaded, and can include a ticket value 304 that identifies the read ticket and is used as an authentication token. As part of this step, the client system 302 can decrypt the command instruction file 310 using a public key corresponding to the file server 306.

In step 420, data transfer manager 304 checks that there is sufficient disk space available on client system 302's storage system for the file corresponding to the file download request.

In step 425, file server 306 calculates a digest for the entire file and for each section of the file. The digests can be calculated according to various methods including, for example, an MD5 hash algorithm.

In step 430, the sections are downloaded; that is, they are transmitted by file server 306 and received by client system 302 using multiple processing threads and according to the file download request and the command instruction file. In disclosed embodiments, the sections are transmitted as follows: data transfer manager 304 sends a section request 326 to file server 306 to transmit a file section, file server 306 reads the section from file server volume 308, and file server 306 sends a response to data transfer manager 304 with the section, that is received by client system 302. The transferred sections can comprise all or a portion of file 320.

In disclosed embodiments, a request to transmit a file section can include multiple header fields. In a particular embodiment, one or more header fields in a section download request can indicate a section of the requested file to transmit. In such an embodiment, a section can be indicated, for example, by specifying a range of bytes requested (e.g. bytes 0-4194303). A section download request can further include, in some embodiments, various header fields to indicate transfer-related information, such as read ticket information, a counter indicating the number of validation attempts, or compression encoding information. Those skilled in the art will recognize that this list is non-exhaustive and various embodiments of the disclosed invention can include these or other header fields or any combination thereof.

Similarly, in disclosed embodiments, a response sent by file server 306 can include multiple header fields. In various embodiments, a response can include header fields for the entire-file digest, the digest corresponding to the requested section, the file section data (compressed or uncompressed), or the range of the section being transmitted (e.g. bytes 46137344-50331647 of 68367155). Those skilled in the art will recognize that this list is non-exhaustive and various embodiments of the disclosed invention can include these or other header fields or any combination thereof.

The transfer is performed using multiple processor threads to allow transfers in parallel and facilitate faster file transfers. The transfer process is continued until the last section of the file is transferred. In disclosed embodiments, file server 306 looks for existing metadata and a partial download file before starting the download. In such a system, if there is already partial download metadata for this file, data transfer manager 304 determines what data client system 302 already has. Sections already downloaded and validated will be skipped. In disclosed embodiments, a download metadata file has enough information to seek to the proper point in the file, initialize and resume calculation of the entire file digest, and send only the missing sections. If file server 306 has no metadata for this file or section, it will calculate the section digest and add it to the metafile in server volume 308. If an intermediate server contains the data in its cache, but contains no section digest, the intermediate server will not return a section digest. Instead, it will simply return the cached section data, chunked like any other request. In this event, the client does not validate the digest and there is no chance of validation error. Each section can have a corresponding digest or other validation value that is also transferred to the client system 302.

In step 435, during the download process, data transfer manager 304 validates the integrity of the transferred data. The transferred data can be validated by various methods. In one embodiment, for example, the integrity of the transferred data is validated using a checksum procedure. Validating transferred data during transfer serves to prevent any outside party from tampering with the data while it is being downloaded.

In step 440, after all of the sections have been transmitted, data transfer manager 304 reassembles the sections into the entire file.

The following table describes some example header fields in a request for the download of a file section and corresponding response in accordance with disclosed embodiments.

Request Header Fields:

| | |
|---|---|
| User-Agent | {User agent} e.g., "FSCNativeClientProxy 11.1.0 (bd: 20130506)" |
| X-Ticket | {FMS ticket} e.g. "a4a194ba9ad6b1c15b5ef6bcb0245a25c682e24c5 83d8e410c1618d69df7f0d4v1004T6690449edb953 5cbbe136ad671f23c792110%2f02%2f26+19%3a22% 3a48fms.teamcenter.com++++++++++++++fmsuse r++++++++++++++++++++++++++myvol++++++++++++ ++++++++++++++++TestFile4096.bin" |
| X-Policy | {policy} e.g. "DMG" |
| X-Attempt | {decimal String (int): Number of validation retries} e.g. "0" |
| Accept-Encoding | "gzip" (if compressed) |
| Range | {Range of bytes requested} e.g., "bytes=0-4194303" |

In particular embodiments, various fields above can be transferred to the server as query parameters without the "X-" prefix, and with the data value URL-encoded. For example, http://fschost:4454/tc/fms?Policy=DMG&FSC-Partial-Digest=MD5%3db89f8 e2ba7d81fc7350a90932e0dae46.

Normal Response—Response Header Fields:

| | |
|---|---|
| HTTP | HTTP Result code and text e.g. "HTTP/1.1 200 OK" e.g. "HTTP/1.1 404 ERROR%5FFILE%5FNOT%5FFOUND%5F4%7Be48e332059 8b42746f37370f82594ffcbbbb%7D%7BmyvolAearh% 2D%2D%2Dsy2a%2D%2D%2D%2DbHA%7D%7BD%3A%5CFMS Share%5CFMSTestExplodedWar%7D%7BUpload67108 864%2Etst%7D" |
| Server | FSC version / build e.g., "FMS-FSC/1.2(bd:20060101)" |
| X-FSC-ERROR-CODE | FSC error code (and text?) e.g., "-9101" |
| X-FMS-Master-Hash | FSC fmsmaster.xml hash value e.g., "1233098eb2197aac324709" |
| X-FSC-Identity-Range | {The range of the file chunk being downloaded} e.g., "bytes=46137344-50331647/68367155" Note that the size of the chunk (4194304) can be extracted from this value. May be less than 4MB if this represents the last chunk of the file. Always provided, even if the data is not compressed. |
| X-FSC-Partial-Digest | {hexadecimal digest value for requested section} e.g., "MD5=b89f8e2ba7d81fc7350a90932e0dae46" |
| X-FSC-Digest | {hexadecimal digest value for entire file} e.g. "fbe1ce877f06e365ce33ffddba60c69e" |

| | |
|---|---|
| Content-Range | Content Range e.g., "bytes=46137344-50331647/68367155" (uncompressed) |
| Transfer-Encoding | "chunked" (compressed) |
| Cache-Control | "private" |
| Content-Type; charset | "application/octet-stream; charset=UTF-8" (uncompressed) |
| Content-Transfer-Encoding | "gzip" (compressed) or "binary" (uncompressed) |
| Date | {ignored} e.g., "Fri, 03 May 2013 16:37:48 GMT" |
| Cache-Control | {ignored} e.g., "private" |
| Content-Type; charset | {ignored} e.g., "text/plain; charset=ISO-8859-1" |
| Body | {gzip-compressed file data} or {uncompressed file data} |

Figure 5:
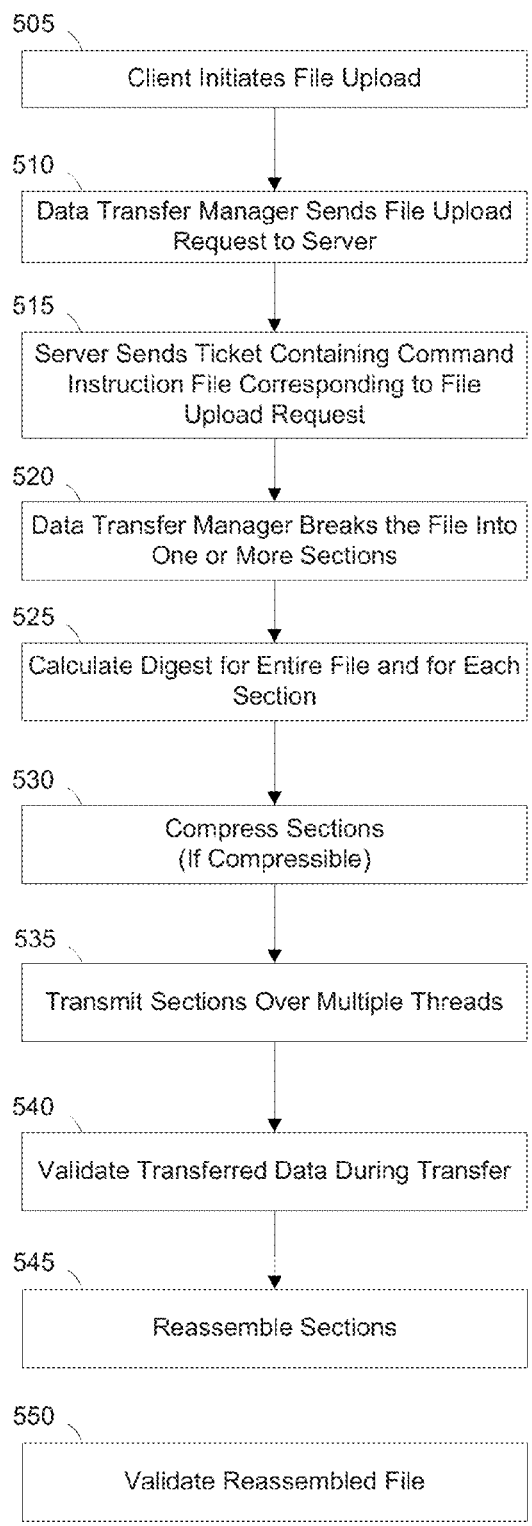
FIG. 5 illustrates a flowchart of the file upload process in accordance with disclosed embodiments.

FIG. 5 illustrates a flowchart of a file upload process in accordance with disclosed embodiments that may be performed, for example, by one or more file server systems and one or more client systems in a product data management system. FIG. 5 is described in reference to the block diagram in FIG. 3. Initially, users of client system 302 can initiate a file upload request from client system 302 to file server 306 by invoking data transfer manager 304 (step 505).

In step 510, client system 302 can use data transfer manager 304 to send a file upload request to file server 306.

In step 515, data transfer manager 304 on client system 302 receives a write ticket from file server 306. In disclosed embodiments, the write ticket received by the data transfer manager 304 contains, at least, a command instruction file 310 corresponding to the file upload request.

In step 520, data transfer manager 304 breaks the file corresponding to the file upload request into multiple sections. In a particular embodiment, the file is broken up into 4 MB sections. However, those skilled in the art will recognize that a file could be broken up into sections of larger or smaller size.

In step 525, data transfer manager 304 calculates a digest for the entire file and for each of the sections. The digests can be calculated according to various methods including, for example, an MD5 hash algorithm.

Then, prior to transmission, the sections are compressed, if compressible (step 530). In a particular embodiment, the sections are compressed, for example, into a GZIP file format.

In step 535, the sections are uploaded (transmitted from the client system to the file server) using multiple processing threads. In disclosed embodiments, the sections are transmitted as follows: data transfer manager 304 transmits a file section to file server 306, file server 306 writes the section to server volume 308, and file server 306 sends a response to data transfer manager 304 indicating a successful section transfer. The transfer is performed over multiple threads to facilitate faster file transfers. This process is continued until the last section of the file is transferred to file server 306 and stored on server volume 308.

In disclosed embodiments, a request to upload a file section can include multiple header fields. In a particular embodiment, one or more header fields in a section upload request can indicate a section of the file being uploaded. In such an embodiment, a section can be indicated, for example, by specifying a range of the file being uploaded (e.g. bytes 46137344-50331647 of 68367155). A section upload request can further include, in some embodiments, various header fields to indicate upload-related information, such as write ticket information, a counter indicating the number of validation attempts, or compression encoding information. Those skilled in the art will recognize that this list is non-exhaustive and various embodiments of the disclosed invention can include these or other header fields or any combination thereof.

Similarly, in disclosed embodiments, a response sent from file server 306 to data transfer manager 304 can include multiple header fields. In various embodiments, a response can include header fields for information such as upload success results and content length. Those skilled in the art will recognize that this list is non-exhaustive and various embodiments of the disclosed invention can include these or other header fields or any combination thereof.

In disclosed embodiments, file server 306 looks for existing metadata before starting the upload. In such a system, if there is already partial upload metadata for this file, data transfer manager 304 determines what data file server 306 already contains. Sections already uploaded and validated will be skipped. In disclosed embodiments, an upload metadata file has enough information to seek the proper point in the client file, initialize and resume calculation of the entire file digest, and send only the missing sections to file server 306. In a particular embodiment, file server 306 can search for existing metadata by sending a request to data transfer manager 304 for a file section's metadata. In such an embodiment, data transfer manager 304 can send a corresponding response with metadata relating to the requested section. Both the metadata request and corresponding response can contain multiple header fields.

During the upload process, file server 306 validates the integrity of the transferred data (step 540). The transferred data can be validated by various methods. In one embodiment, for example, the integrity of the transferred data is validated using a checksum procedure. Validating transferred data during transfer serves to prevent any outside party from tampering with the data while it is being uploaded. Additionally, this process prevents corrupted data from getting stored on server volume 308.

In step 545, after all of the sections have been transmitted, the system reassembles the sections into the entire file.

In step 550, the system validates the integrity of the reassembled file. In some embodiments, the reassembled file is validated by data transfer manager 304 sending a reassembly validation request to file server 306. In such an embodiment, the reassembly validation request can contain one or more header fields for information such as the file's length and entire file digest. In response to this request, file server 306 can send back a response that can also contain one or more header fields for information such as, for example, upload result information. Those skilled in the art will recognize that the header fields listed are provided by way of illustration and various embodiments of the disclosed invention can include various other header fields. If the validation fails, the system can delete the reassembled file or any of the sections, restart the transfer of some or all sections, warn the user, or perform other processes.

The following table describes some example header fields in a request for upload of a file section's metadata and corresponding response in accordance with disclosed embodiments.

Request Header Fields:

| | |
|---|---|
| X-Ticket | {FMS ticket} e.g., "a4a194ba9ad6b1c15b5ef6bcb0245a25c6 82e24c583d8e410c1618d69df7f0d4v1004 T6690449edb9535cbbe136ad671f23c7921 10%2f02%2f26+19%3a22%3a48fms.teamce nter.com++++++++++++++fmsuser++++++ +++++++++++++++++++myvol+++++++++++ ++++++++++++++++TestFile4096.bin" |
| X-Policy | {policy} e.g., "DMG" |
| X-FSC-Metadata | {metadata flag} "true" |
| User-Agent | {User agent} e.g., "FSCNativeClientProxy 11.1.0 (bd: 20130506)" |
| Transfer-Encoding | "chunked" |
| Cache-Control | "private" |
| Content-Type; charset | "application/octet-stream; charset=UTF-8" |
| Content-Transfer-Encoding | "binary" |
| Content-Length | Content Length (of the metadata body) e.g., "173" |
| Body | {uncompressed XML file metadata, including the original file name} e.g., "originalFileName=doodah.txt\nfileS ize=2098674\n..." |

In disclosed embodiments, various fields above can be transferred to the server as query parameters without the "X-" prefix, and with the data value URL-encoded. For example, "http://fschost:4454/tc/fms?Policy=DMG&FSC-Partial-Digest=MD5%3db89f 8e2ba7d81fc7350a90932e0dae46"

Normal Response—Response Header Fields:

| | |
|---|---|
| HTTP | HTTP Result code and text e.g. "HTTP/1.1 200 OK" e.g. "HTTP/1.1 400 ERROR%5FNOT%5FALLOWED%5FTO%5FOVERWRITE %5FVOLUME%5FFILE%5F4%7Be48e3320598b427 46f37370f82594ffcbbbb%7D%7BmyvolAearh% 2D%2D%2Dsy2a%2D%2D%2D%2DbHA%7D%7BD%3A% 5CFMSShare%5CFMSTestExplodedWar%7D%7BU pload67108864%2Etst%7D" |
| Server | FSC version / build e.g. "FMS-FSC/1.2(bd:20060101)" |
| X-FSC-ERROR-CODE | FSC error code (and text?) e.g., "-9101" |
| X-FMS-Master-Hash | FSC fmsmaster.xml hash value e.g., "1233098eb2197aac324709" |
| Content-Length | Content Length (of the response body) e.g., "27" |
| Date | {ignored} e.g., "Fri, 03 May 2013 16:37:48 GMT" |

-continued

| | |
|---|---|
| Cache-Control | {ignored} e.g., "private" |
| Content-Type; charset | {ignored} e.g., "text/plain; charset=UTF-8" |
| Body | {none/ignored} (Optional alternate HTTP error text?) |

The following table describes some example header fields in a request for upload of a file section and corresponding response in accordance with disclosed embodiments.

Request Header Fields:

| | |
|---|---|
| User-Agent | {User agent} e.g., "FSCNativeClientProxy 11.1.0 (bd: 20130506)" |
| X-Ticket | {FMS ticket} e.g., "a4a194ba9ad6b1c15b5ef6bcb0245a25c6 82e24c583d8e410c1618d69df7f0d4v1004 T6690449edb9535cbbe136ad671f23c7921 10%2f02%2f26+19%3a22%3a48fms.teamce nter.com++++++++++++++fmsuser++++++ +++++++++++++++++++myvol+++++++++++ ++++++++++++++++TestFile4096.bin" |
| X-Policy | {policy} e.g., "DMG" |
| X-FSC-Partial-Digest | e.g., "MD5=b89f8e2ba7d81fc7350a90932e0dae 46" |
| X-Attempt | {decimal String (int): Number of validation retries} e.g. "0" |
| X-FSC-Identity-Range | {The range of the file chunk being uploaded} e.g., "bytes=46137344-50331647/68367155" Note that the size of the chunk (4194304) can be extracted from this value. May be less than 4MB if this represents the last chunk of the file. Always provided, even if the data is not compressed. |
| Transfer-Encoding | "chunked" (compressed) |
| Cache-Control | "private" |
| Content-Type; charset | "application/octet-stream; charset=UTF-8" (uncompressed) |
| Content-Transfer-Encoding | "gzip" (compressed) or "binary" (uncompressed) |
| Body | {gzip-compressed file data} or {uncompressed file data} |

In a particular embodiment, various fields above can be transferred to the server as query parameters without the "X-" prefix, and with the data value URL-encoded. For example, "http://fschost:4454/tc/fms?Policy=DMG&FSC-Partial-Digest=MD5%3db89 f8e2ba7d81fc7350a90932e0dae46"

Normal Response—Response Header Fields:

| | |
|---|---|
| HTTP | HTTP Result code and text e.g. "HTTP/1.1 200 OK" e.g. "HTTP/1.1 400 ERROR%5FNOT%5FALLOWED%5FTO%5FOVERWR ITE%5FVOLUME%5FFILE%5F4%7Be48e33205 98b42746f37370f82594ffcbbbb%7D%7Bmy volAearh%2D%2D%2Dsy2a%2D%2D%2D%2DbH A%7D%7BD%3A%5CFMSShare%5CFMSTestExp lodedWar%7D%7BUpload67108864%2Etst% 7D" |

-continued

| | |
|---|---|
| Server | FSC version / build<br>e.g. "FMS-FSC/1.2(bd:20060101)" |
| X-FSC-ERROR-CODE | FSC error code (and text?) e.g., "-9101" |
| X-FMS-Master-Hash | FSC fmsmaster.xml hash value<br>e.g., "1233098eb2197aac324709" |
| Content-Length | Content Length (of the response body) e.g., "27" |
| Date | {ignored} e.g., "Fri, 03 May 2013 16:37:48 GMT" |
| Cache-Control | {ignored} e.g., "private" |
| Content-Type; charset | {ignored} e.g., "text/plain; charset=UTF-8" |
| Body | {none/ignored} (Optional alternate HTTP error text?) |

The following table describes some example header fields in a request for reassembly validation of uploaded sections and corresponding response in accordance with disclosed embodiments.

Request Header Fields:

| | |
|---|---|
| User-Agent | {User agent} e.g., "FSCNativeClientProxy 11.1.0 (bd: 20130506)" |
| X-Ticket | {FMS ticket}<br>e.g.<br>"a4a194ba9ad6b1c15b5ef6bcb0245a25c6 82e24c583d8e410c1618d69df7f0d4v1004 T6690449edb9535cbbe136ad671f23c7921 10%2f02%2f26+19%3a22%3a48fms.teamce nter.com++++++++++++++fmsuser++++++ +++++++++++++++++++myvol+++++++++++ +++++++++++++++++TestFile4096.bin" |
| X-Policy | {policy}<br>e.g. "DMG" |
| X-FSC-Identity-Length | {The length of the original uncompressed file} (if compressible) |
| X-FSC-Digest | {Digest Type}<br>e.g. "MD5" |
| Transfer-Encoding | "binary" |
| Content-Type; charset | "application/octet-stream; charset=UTF-8" |
| Content-Length | {The decimal length of the body}<br>e.g. "32" |
| Cache-Control | "private" |
| Body | {hexadecimal digest value for entire file}<br>e.g.<br>"fbe1ce877f06e365ce33ffddba60c69e" |

In disclosed embodiments, various fields above can be transferred to the server as query parameters without the "X-" prefix, and with the data value URL-encoded. For example, http://fschost:4454/tc/fms?Policy=DMG&FSC-Partial-Digest=MD5%3db89f8e 2ba7d81fc7350a90932e0dae46. In such an embodiment, this request is sent only after all file pieces have been successfully uploaded from the client.

Normal Response Header Fields:

| | |
|---|---|
| HTTP | HTTP Result code and text<br>e.g. "HTTP/1.1 200 OK"<br>e.g. "HTTP/1.1 400 ERROR%5FNOT%5FALLOWED%5FTO%5FOVERWR |

ITE%5FVOLUME%5FFILE%5F4%7Be48e33205 98b42746f37370f82594ffcbbbb%7D%7Bmy volAearh%2D%2D%2Dsy2a%2D%2D%2D%2DbH A%7D%7BD%3A%5CFMSShare%5CFMSTestExp lodedWar%7D%7BUpload67108864%2Etst% 7D" |
| Server | FSC version / build e.g., "FMS-FSC/1.2(bd:20060101)" |
| X-FSC-ERROR-CODE | FSC error code (and text?) e.g., "-9101" |
| X-FMS-Master-Hash | FSC fmsmaster.xml hash value e.g., "1233098eb2197aac324709" |
| Content-Length | Content Length (of the response body) e.g., "27" |
| Date | {ignored} e.g., "Fri, 03 May 2013 16:37:48 GMT" |
| Cache-Control | {ignored} e.g., "private" |
| Content-Type; charset | {ignored} e.g., "text/plain; charset=UTF-8" |
| Body | {XML Metadata} |

In disclosed embodiments, this request can also be used to query upload status when a file has been paused, before resuming. The returned XML metadata can indicate which file sections are retained and missing from a previous upload operation.

Figure 6:
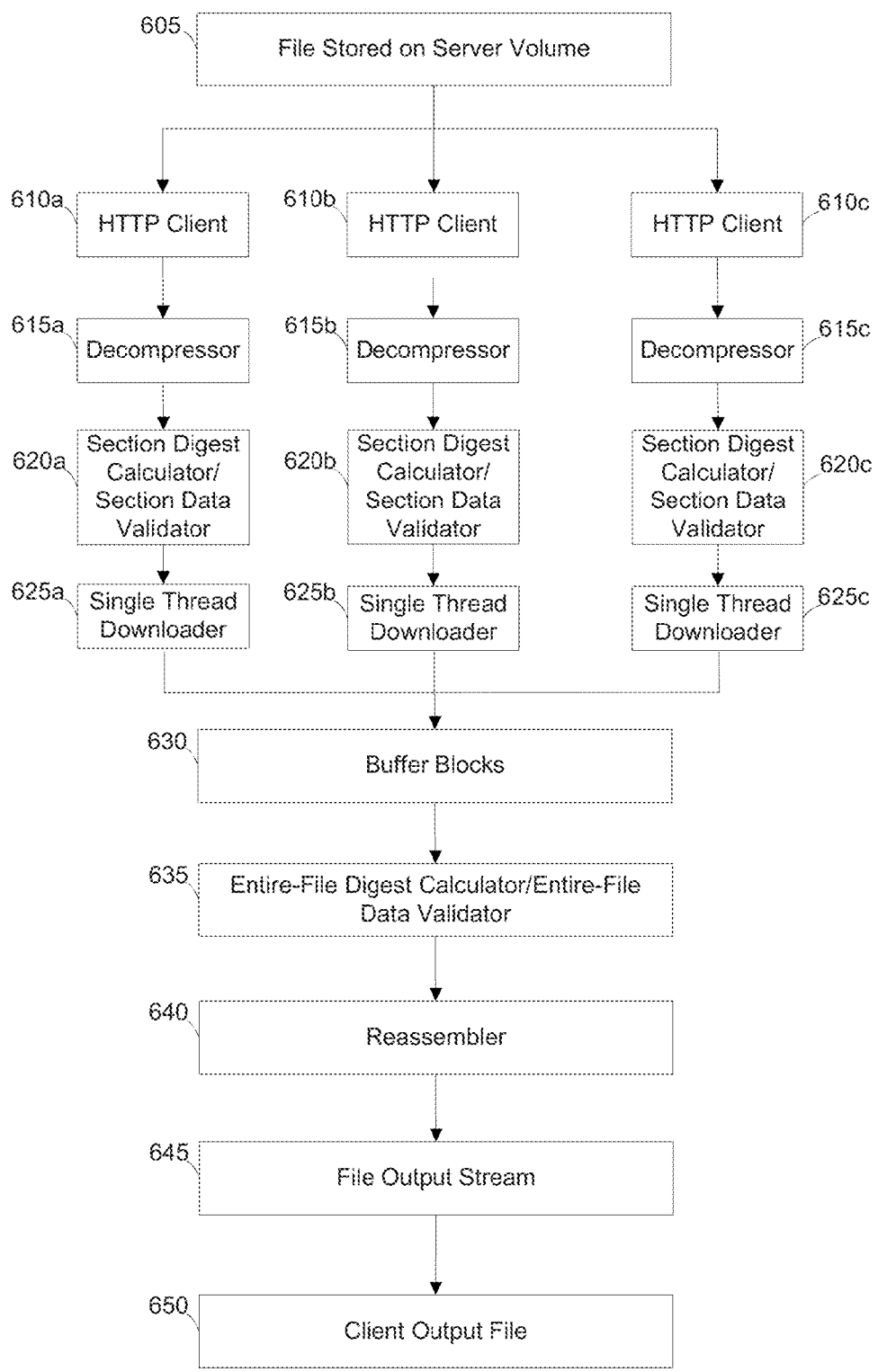
FIG. 6 illustrates a client-side download data flow in accordance with disclosed embodiments.

FIG. 6 illustrates a client-side download data flow in accordance with disclosed embodiments. The process starts with the file stored on server volume 308 (step 605). In disclosed embodiments, one of the server volume 308 threads may analyze the entire requested file to compute an entire file digest for later use in data validation. In embodiments in which there are multiple server systems, sections of the requested file may be stored on multiple storage systems. In such systems, the data can be stored in a temporary file accessible to all server systems.

In disclosed embodiments, at the end of reading each section, a download metadata file can be updated with information to facilitate the "resume" functionality. In such an embodiment, the download metadata file can include the start offset of the source section represented, for example, in transport line termination units. However, those skilled in the art will recognize that the offset can be represented in various units in accordance with disclosed embodiments. In a "resume" function, the start offset gets passed to file server 306 as the start of the download range.

The download metadata file can also include the end offset of the source section represented, in one embodiment, in client line termination units. The end offset can be used to search the client file for the appropriate resume point, in the event that the particular section is the last complete section that gets completely downloaded before a "pause" event occurs and the data gets removed. The end offset will be the starting file offset for the following section. The starting range offset for the following section is known from the start offset of this section and the section size.

The download metadata file may also include, in a particular embodiment, the section's digest (e.g. an MD5 hash digest), which is used internally for validation purposes and is stored for comparison with the section's digest as stored in server volume 308. Additionally, the download metadata file may include the current digest of the portion of the entire file that has been transferred so far. In the event of a resume, the entire-file digest can be initialized to this state value before processing additional data. Disclosed embodiment can use an adapted internal MD5 hash algorithm to save the intermediate MD5 calculation state without completing closure computations.

As shown in FIG. 6, file downloads are performed using multiple threads. In step 610*a-c*, the file sections are directed through an HTTP client. Note that while this example illustrates three threads, disclosed embodiments can use any number of execution threads.

Next, each section is sent through a decompressor, if the data is compressed (step 615*a-c*). In a particular embodiment, the sections are decompressed, for example, using a GZipinput stream.

In step 620*a-c*, each section is sent through a section digest calculator and section data validator.

In step 625*a-c*, each of the sections is directed to separate single thread downloaders.

From the single thread downloader, the sections are used to populate reusable memory blocks in data transfer manager 304's memory system, herein referred to as buffer blocks (step 630). Some embodiments may use twice as many buffer blocks as threads, or enough to contain the entire file, whichever is least. In some embodiments, file access is likely to be faster than the section transfer and server response. This leaves enough buffer blocks available at the end of each "wave" of section downloads to restart the next "wave" without additional file system delay.

In disclosed embodiments, the first buffer block is allocated and assigned to the first single thread downloader. The first single thread downloader can then send a response to data transfer manager 304 indicating the size of the file. At this time, the remaining buffer blocks can be allocated and assigned to other single thread downloader instances. In disclosed embodiments, partial data during transfer is written to a single partial file on the client side.

In step 635, the sections are used to create a digest for the entire file digest to perform entire file data validation. In a particular embodiment, if data transfer manager 304 reports a data validation error, then another attempt to download the section on a new thread can be initiated by the single thread downloader. In such an embodiment, a counter indicating the number of attempts to download a particular section can be passed to file server 306 as part of the download metadata file.

Once data transfer manager 304 receives all sections and validates the entire-file data, the received sections are multiplexed through a single-threaded reassembler (step 640). In disclosed embodiments, when client 302 "pauses" a download, no new downloads will be started or retried on the network. In such an embodiment, the reassembler will continue to process the buffer block data already successfully downloaded, as long as the buffers are all present and in order. The client may lose any buffer block data beyond the first missing section after a "pause" operation. However, in said embodiment, the performance of the file access is likely to exceed that of the network access and therefore this should have minimal impact on the pause/resume functionality of the overall file download.

The reassembled file is then directed through a file output stream (step 645) and delivered to client 302 (step 650).

Figure 7:
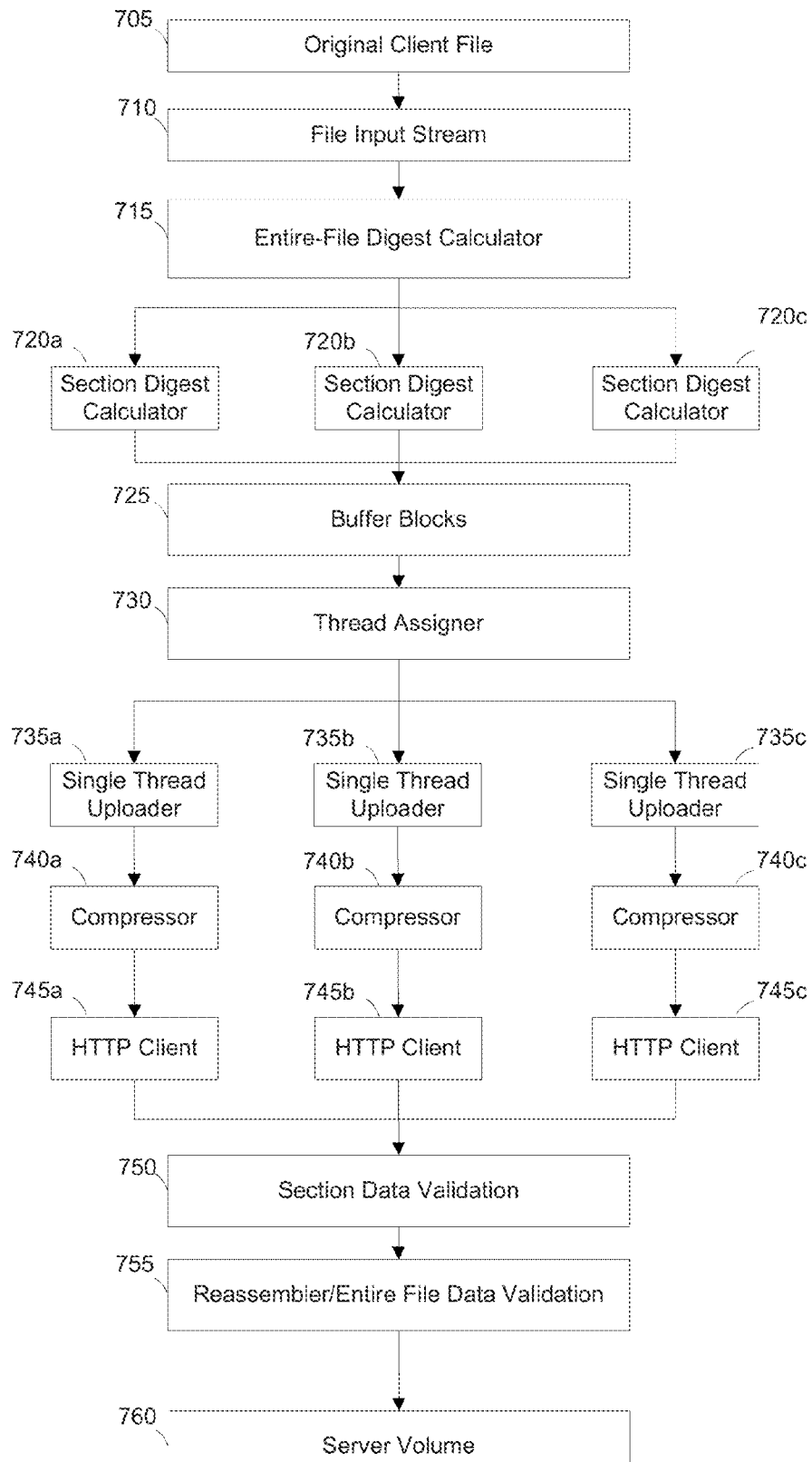
FIG. 7 illustrates a client-side upload data flow in accordance with disclosed embodiments.

FIG. 7 illustrates a client-side upload data flow in accordance with disclosed embodiments. The process starts with the original client file in step 705.

The file is first read end-to-end by a file input stream of data transfer manager 304 (step 710). In a particular embodiment, none of the file data needs to be read more than once. Disclosed embodiments read the file only once and store the data in buffer blocks. In such a system, if a data upload fails and is retried, the data may be re-uploaded from the buffer blocks instead of re-reading the file from disk. As shown in FIG. 7, file access in step 710 is single-threaded per file upload. This done to ensure that the data is read from the file in the proper order.

In a particular embodiment, if the file being uploaded is a text file, the file input stream normalizes the line termination.

In disclosed embodiments, at the end of reading each section from file, an upload metadata file is updated with various information to facilitate the "resume" functionality. In such an embodiment, the upload metadata file can include the start offset of the target section. In a particular embodiment, the start offset of the target section can be represented, for example, in transport line termination units. However, those skilled in the art will recognize that the start offset can be represented in various units in accordance with disclosed embodiments. In a "resume" function, the start offset gets passed to file server 306 as the start of the upload range.

Further, in a disclosed embodiment, the upload metadata file may also include the end offset of the source section expressed, for example, in client line termination units. The end offset is used in a "resume" function to search the client file for the appropriate resume point, in the event that the particular section is the last complete section that gets completely sent to file server 306 before a pause event occurs and the data stored in the buffer blocks gets removed. The end offset of the source section may be used as the starting file offset for the following section. The starting range offset for the following section is known from the start offset of the section and the section size. The section size is, in some embodiments, represented in transport line termination units.

The upload metadata file may also include, in a particular embodiment, the section's digest (e.g. an MD5 hash digest), which is sent to file server 306 for validation purposes, and the current digest for the portion of the entire file that has been transferred so far. Disclosed embodiments can use an adapted MD5 hash algorithm to save the intermediate MD5 calculation state without completing the closure computations.

According to an embodiment, partial data is not persisted to file on the client side—with access to the metadata, a system can re-read the data from the original file in the event of a "resume" function.

In step 715, data transfer manager 304 calculates a digest for the entire file. Then, the file is divided into one or more sections and a digest is calculated for each of the sections independently (steps 720*a-c*). The digests for the entire file and for each of the sections can be calculated according to various methods including, for example, an MD5 hash algorithm.

In step 725, the sections are stored in buffer blocks. In disclosed embodiments, each buffer block holds the data for one section of the file at a time. Some embodiments use twice as many buffer blocks as threads, or enough to contain the entire file, whichever is least. In such a system, the buffer blocks are attached to an object also containing the metadata relevant to the section.

In step 730, data is directed through a thread assigner. This thread assigner directs each section stored in a buffer block to a separate single thread uploader (step 735*a-c*).

In some embodiments, file access can be faster than the section transfer and server response. This leaves enough buffer blocks restocked at the end of each "wave" of section uploads to restart the next "wave" without additional file system delay.

In steps 740*a-c*, the sections are compressed, if compressible. In a particular embodiment, the sections are compressed, for example, into a GZIP file format.

In step 745*a-c*, the sections are directed through a HTTP client to file server 306.

During upload, the integrity of the data being transferred is validated (step 750). In a particular embodiment, if file server 306 reports a data validation error, or any other retry-able error, then another attempt to upload the section on a new thread can be initiated at step 730. In such an embodiment, a counter indicating the number of attempts to send a particular section can be passed to file server 306 as part of the upload metadata file. The number of attempts may have a maximum threshold before the upload is considered to have failed.

In disclosed embodiments, the last section to be uploaded may be shorter than the other uploaded sections. In some embodiments, this last section may contain the file's identity length and the entire-file digest. Once file server 306 receives a section containing this information, file server 306 can determine that the file upload is complete and can perform reassembly and validation of the file (step 755).

Once all sections of the file have been sent successfully, file server 306 can be queried for any missing sections. If file server 306 reports one contiguous file with no missing parts, this indicates that the file has been reassembled and validated. Otherwise, file server 306 can return an upload reassembly error. After the upload is completed, the upload metafile can be deleted.

In step 760, the successfully transferred file is stored on server volume 308.

Disclosed embodiments can perform file transfers according to a command instruction file 310. A command instruction file 310 can include a list of the transactions that, when completed, perform the file transfer. To complete the transactions contained in the command instruction file 310, disclosed embodiments of data transfer manager 304 can implement one or more software engines, herein referred to as transaction engines.

The following table describes some examples of the primary classes that can be present in a transaction engine of data transfer manager 304 in accordance with disclosed embodiments:

| Class | Description |
| --- | --- |
| DMEngine | The main Download Manager Engine class. Sets up and performs core engine functionality. |
| InterfaceData Share ManagerUI | The interface by which the engine communicates with the User Interface. |
| TransactionList | The list of current Download Manager transactions. The User interface will snapshot the list and process a copy of the master collection. |
| IFMSTransaction | The interface defining an FMS background transaction. |
| UploadTransaction | An IFMSTransaction implementation that uploads files from the client machine to an FSC volume server. |
| DownloadTransaction | An IFMSTransaction implementation that downloads files from an FSC volume server to the client machine. |
| MetadataTransaction | A class that uploads metadata from the client machine to an FSC volume server. This transaction runs prior to an UploadTransaction. A MetadataTransaction is not an IFMSTransaction, but is paired with a specific UploadTransaction. MetadataTransaction instances cannot be paused, resumed or cancelled. |
| DMAPI | The Download Manager API class houses the thread that checks for new task files periodically and introduces new tasks into the system. |
| DMTaskParser | This class parses the various Download Manager task files and checks them for proper format per the DTD. |
| TaskInfo | This class represents the XML information contained in one Download Manager Task File or Browse File, and can read and write this information to the Download Manager Task Directory. |
| TransactionInfo | This class represents the XML information related to one transaction. This may be stored in (read from or saved as) a Download Manager Transaction File, Error File, or History File. |
| TicketEncryptor | This class encrypts FMS Tickets when a transaction (or task) is written to file, or decrypts them when a transaction or task is read from file. The encryption key is based on the user's network MAC address. |
| FSCUrlList | This class stores a list of parent FSC URLs. The list can be persisted in an XML format, or passed to the FSCClientProxy. |

Transaction states used in certain embodiments are described below. In the case of a download request, such as a DownloadTransaction class object, the transaction is set into the "pending" state and added to a queue. The state remains "pending" until a thread picks up the transaction and begins to execute it.

In the case of an upload request, such as an UploadTransaction class object, there is a companion object, such as a MetadataTransaction class object, created and attached to the UploadTransaction. The UploadTransaction is set into the "meta pending" state and the MetadataTransaction is added to a queue of a separate metadata uploader thread. A "metadata pending" transaction may be displayed in the same way as a "pending" transaction in the user interface, even though the numerical state values are different.

In disclosed embodiments, an object relating to a metadata transaction, such as a MetadataTransaction object, has no transaction state of its own. In such an embodiment, the MetadataTransaction object updates the state of its parent transaction, such as an UploadTransaction object.

In disclosed embodiments, if the metadata upload fails, the MetadataTransaction places the UploadTransaction in the "meta failed" state. If an upload is resumed or retried from the "meta failed" state, the UploadTransaction will request to create and re-queue another MetadataTransaction.

Once the metadata upload completes, the MetadataTransaction places the UploadTransaction in the "pending" state, and the UploadTransaction is then posted to the queue of the DMEngine's main transaction pool. The state remains "pending" until a thread in the transaction pool picks up the transaction and begins to execute it.

Each transfer transaction, such as an IFMSTransaction (UploadTransaction or DownloadTransaction), places itself in the "active" state when it begins to run. Each transaction runs until it completes, is paused by the user, or fails.

If the transaction fails, it is placed in the "failed" state. In this state, an error text describing the failure may be accessible to a user. In some embodiments, a resume/retry function may repeat the attempt to complete the transaction from the point of failure. In the case of data validation error, disclosed embodiments may retransmit any invalid data from a "clean" source to avoid a repeat of the data validation error.

In disclosed embodiments, only "active" transactions can be paused. When an active transaction is paused, it is placed in the "paused" state. The data share manager can pass a special "pause" response to shut down the transaction on and free the transaction thread. Any partially completed data can be left in anticipation that the transaction will be resumed at a later time. In the "paused" state, an error text describing the failure may contain the equivalent of "User paused the transaction". A resume/retry can repeat the attempt to complete the transaction, from at or near the point at which it was paused.

If a transaction completes successfully, it is placed in the "complete" state. The transaction file may be written as a history file but it can no longer be resumed or retried.

In some embodiments, any "meta failed", "active", "paused", "failed", or "complete" uploads can be removed to clean up client files related to the transaction. In a particular embodiment, if a file is "active" at the time of removal, the transaction will be cancelled first. A cancellation differs from a pause in that any temporary or intermediate files are removed in a cancellation. The transaction may be restarted from the beginning following a cancellation.

In a disclosed embodiment, a completed transaction remains in the data transfer manager until it is removed. In the case of a download, the user can launch the downloaded file, or the directory in which that file resides. This may or may not be the data transfer manager's download directory as a user could have specified a different directory path.

Completed transactions may be removed from a queue, such as the TransactionList, after a predetermined amount of time. The local file related to a completed transaction may also be deleted from the local file system. This also removes the transaction from the TransactionList.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 and the other systems described may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 U.S.C. §112(f) unless the exact words "means for" are followed by a participle.

What is claimed is:

1. A method for file transfer, the method comprising:
   sending, by a client data processing system, a file download request to a file server data processing system, the file download request identifying a range of bytes corresponding to a section of a file to be downloaded;
   receiving, by the client data processing system, a command instruction file from the file server data processing system, the command instructions file containing a list of instructions that, when executed, perform a file transfer according to the file download request, the command instruction file including a ticket value;
   downloading, by the client data processing system and according to the command instruction file, the section of the file corresponding to the file download request and identified by the range of bytes, wherein the client data processing system uses the ticket value as an authentication token when downloading the section of the file;
   receiving, by the client data processing system, a section response from the file server data processing system, wherein the section response comprises the section of the file and a digest for the section; and
   in response to a determination that all sections of the file have been received, reassembling the sections.

2. The method of claim 1, wherein the command instruction file defines a plurality of transactions for downloading of the file corresponding to the section of the file download request, and wherein the command instruction file includes at least an address of a file server from which the section of the file is downloaded.

3. The method of claim 1, wherein the received command instruction file is encrypted, further comprising:

decrypting, by the client data processing system, the command instruction file using a public key corresponding to the file server data processing system.

4. The method of claim 1, further comprising validating, by the client data processing system, the section of the file during the downloading.

5. The method of claim 1, wherein the downloading is performed using multiple processing threads.

6. The method of claim 1, further comprising:
sending, by the client data processing system, a file upload request to the file server data processing system;
receiving, by the client data processing system, a second command instruction file from the file server data processing system; and
uploading, by the client data processing system, a file corresponding to the file upload request according to the second command instruction file.

7. A client data processing system comprising:
a processor; and
an accessible memory, the client data processing system particularly configured to:
send a file download request to a file server data processing system, the file download request identifying a range of bytes corresponding to a section of a file to be downloaded;
receive a command instruction file from the file server data processing system, the command instructions file containing a list of instructions that, when executed, perform a file transfer according to the file download request, the command instruction file including a ticket value;
download the section of the file corresponding to the file download request and identified by the range of bytes according to the command instruction file, wherein the client data processing system uses the ticket value as an authentication token when downloading the section of the file;
receiving a section response from the file server data processing system, wherein the section response comprises the section and a digest for the section; and
in response to a determination that all sections of the file have been received, reassembling the sections.

8. The client data processing system of claim 7, wherein the command instruction file defines a plurality of transactions for downloading of the section of the file corresponding to the file download request, and wherein the command instruction file includes at least an address of a file server from which the section of the file is downloaded.

9. The client data processing system of claim 7, wherein the received command instruction file is encrypted, wherein the client data processing system is further configured to decrypt the command instruction file using a public key corresponding to the file server data processing system.

10. The client data processing system of claim 7, further configured to validate the file during the download.

11. The client data processing system of claim 7, wherein the downloading is performed using multiple processing threads.

12. The client data processing system of claim 7, further configured to:
send a file upload request to the file server data processing system;
receive a second command instruction file from the file server data processing system; and
upload a file corresponding to the file upload request according to the second command instruction file.

13. A non-transitory computer-readable medium encoded with executable instructions that, when executed, cause one or more client data processing systems to perform the steps of:
sending a file download request to a file server data processing system, the file download request identifying a range of bytes corresponding to a section of a file to be downloaded;
receiving a command instruction file from the file server data processing system, the command instructions file containing a list of instructions that, when executed, perform a file transfer according to the file download request, the command instruction file including a ticket value;
downloading the section of the file corresponding to the file download request and identified by the range of bytes according to the command instruction file, wherein the client data processing system uses the ticket value as an authentication token when downloading the section of the file;
receiving a section response from the file server data processing system, wherein the section response comprises the section and a digest for the section; and
in response to a determination that all sections of the file have been received, reassembling the sections.

14. The computer-readable medium of claim 13, wherein the command instruction file defines a plurality of transactions for downloading of the section of the file corresponding to the file download request, and wherein the command instruction file includes at least an address of a file server from which the section of the file is downloaded.

15. The computer-readable medium of claim 13, wherein the received command instruction file is encrypted, further comprising:
decrypting the command instruction file using a public key corresponding to the file server data processing system.

16. The computer-readable medium of claim 13, further comprising validating the section of the file during the downloading.

17. The computer-readable medium of claim 13, further comprising
sending a file upload request to the file server data processing system;
receiving a second command instruction file from the file server data processing system; and
uploading a file corresponding to the file upload request according to the second command instruction file.

* * * * *